United States Patent
Velasco et al.

(10) Patent No.: US 9,516,362 B2
(45) Date of Patent: Dec. 6, 2016

(54) DEVICES, SYSTEMS AND METHODS FOR REDUCING SWITCHING TIME IN A VIDEO DISTRIBUTION NETWORK

(71) Applicants: Adolfo Velasco, Saddle Brook, NJ (US); Daniel Jackson, Valhalla, NY (US)

(72) Inventors: Adolfo Velasco, Saddle Brook, NJ (US); Daniel Jackson, Valhalla, NY (US)

(73) Assignee: Crestron Electronics Inc., Rockleigh, NJ (US)

(*) Notice: Subject to any disclaimer, the term of this patent is extended or adjusted under 35 U.S.C. 154(b) by 0 days.

(21) Appl. No.: 13/764,315

(22) Filed: Feb. 11, 2013

(65) Prior Publication Data

US 2013/0212613 A1 Aug. 15, 2013

Related U.S. Application Data

(60) Provisional application No. 61/597,448, filed on Feb. 10, 2012.

(51) Int. Cl.
| | |
|---|---|
| *H04N 7/16* | (2011.01) |
| *H04N 7/173* | (2011.01) |
| *H04N 21/25* | (2011.01) |
| *H04N 21/434* | (2011.01) |
| *H04N 21/4363* | (2011.01) |
| *H04N 21/4367* | (2011.01) |
| *H04N 21/4402* | (2011.01) |

(52) U.S. Cl.
CPC .......... *H04N 21/25* (2013.01); *H04N 21/4344* (2013.01); *H04N 21/4367* (2013.01); *H04N 21/43635* (2013.01); *H04N 21/4402* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,757,414 A | * | 5/1998 | Thorne | .......................... 725/139 |
| 7,643,731 B2 | * | 1/2010 | Kobayashi | ............. H04N 5/765 |
| | | | | 345/520 |
| 7,702,925 B2 | | 4/2010 | Northcutt et al. | |
| 7,796,194 B2 | | 9/2010 | Hall | |
| 7,893,941 B2 | * | 2/2011 | Day | ....................... G06F 3/1423 |
| | | | | 345/520 |
| 8,321,905 B1 | * | 11/2012 | Streeter | .............. H04N 21/4384 |
| | | | | 709/231 |
| 2006/0140211 A1 | * | 6/2006 | Huang | ...................... G06F 1/26 |
| | | | | 370/466 |

(Continued)

OTHER PUBLICATIONS

Office Action from U.S. Appl. No. 14/500,938 dated Dec. 21, 2015.

(Continued)

*Primary Examiner* — Brian T Pendleton
*Assistant Examiner* — Alexander Gee
(74) *Attorney, Agent, or Firm* — Crestron Electronics Inc.

(57) ABSTRACT

When switching sources, resolutions or refresh rates in a video distribution network, switching times are reduced by maintaining video lock and security authentication between a video switcher and a video sink. The scaler maintains video lock and security authentication by continuing to generate video timing data during switching events. The scaler also facilitates an aesthetically pleasing transition by generating image content data prior to and after the switching event.

35 Claims, 7 Drawing Sheets

(56) References Cited

U.S. PATENT DOCUMENTS

| | | | |
|---|---|---|---|
| 2009/0138935 A1* | 5/2009 | Ohkita | G09G 5/006 725/134 |
| 2010/0138889 A1* | 6/2010 | Subramanian | H04N 21/4331 725/118 |
| 2011/0134330 A1 | 6/2011 | Yu et al. | |
| 2011/0150215 A1* | 6/2011 | Domingo | H04N 7/1675 380/200 |
| 2011/0150216 A1 | 6/2011 | Barry | |
| 2011/0176056 A1 | 7/2011 | Toba | |
| 2011/0197073 A1 | 8/2011 | Taraci | |
| 2012/0147267 A1* | 6/2012 | Ryan | H04N 5/06 348/521 |
| 2013/0103822 A1 | 4/2013 | Wolcott et al. | |
| 2014/0153904 A1 | 6/2014 | Adimatyam et al. | |

OTHER PUBLICATIONS

Office Action from U.S. Appl. No. 14/500,938 dated May 8, 2015.
Response/Amendment in regard to Office Action from U.S. Appl. No. 14/500,938, dated May 8, 2015, Submitted on Nov. 6, 2015.
Notice of Allowance and Allowability from U.S. Appl. No. 14/500,936 dated Jul. 27, 2016.

* cited by examiner

DEVICES, SYSTEMS AND METHODS FOR REDUCING SWITCHING TIME IN A VIDEO DISTRIBUTION NETWORK

BACKGROUND OF THE INVENTION

Technical Field

The present invention relates generally to video distribution networks. More particularly, the invention relates to methods and apparatuses for distributing video protected by a digital rights management scheme.

Background Art

Video distribution networks are increasingly common installations in commercial and residential facilities. Components of a video distribution network are typically located throughout the facility and networked allowing video to be distributed from one or more video source to one or more video sinks. For example, a typical video distribution network in a home may comprise a multitude of video sources, such as Blu-Ray Disc Players, media servers, digital video disc (DVD) players, Digital Video Recorders (DVR), and cable boxes. These video sources may be centrally located such as in an equipment rack in a closet and distributed via a chain of switches and repeaters to various video sinks, such as television displays, computer monitors and projectors, throughout the home.

However, as the digital distribution of television, movies, and music expands, content providers are growing increasingly concerned about the simplicity with which content pirates can copy and share copyrighted material. Various digital rights management (DRM) schemes have been developed to ensure that television shows, movies and music can only be viewed or heard by authorized parties (i.e. paying customers). One DRM scheme to protect digital content as it is transmitted over cables between devices is known as High-Bandwidth Digital Content Protection (HDCP). HDCP is a specified method developed by Digital Content Protection, L.L.C. (DCP) for protecting copyrighted digital content as it travels across connection interfaces and protocols such as DisplayPort (DP), Digital Video Interface (DVI), High-Definition Multimedia Interface (HDMI). The HDMI specification defines an interface for carrying digital audiovisual content from a source such as a Blu-Ray Disc player, to a sink or display device such as a television (TV).

There are three facets to HDCP. First, there is the authentication protocol, through which a source verifies that a given sink is licensed to receive HDCP content. With the legitimacy of the sink determined, encrypted HDCP content may be transmitted between the two devices, based on shared secrets established during the authentication protocol. The use of such shared secrets prevents eavesdropping devices from utilizing the content. Finally, in the event that legitimate devices are compromised to permit unauthorized use of HDCP content, renewability allows a source to identify such compromised devices and prevent the transmission of HDCP content.

The HDCP authentication protocol is an exchange between an HDCP compliant source and an HDCP compliant sink that affirms to the source that the sink is authorized to receive HDCP content by demonstrating knowledge of a set of secret device keys by transmitting a key selection vector (KSV). Each HDCP device is provided with a unique set of these secret device keys, referred to as the Device Private Keys, from DCP. The communication exchange also provides for both the HDCP compliant source and sink to generate a shared secret value that cannot be determined by eavesdropping on that exchange. By having that shared secret information embedded into the demonstration of authorization, the shared secret can then be used as a symmetric key to encrypt HDCP content intended only for the authorized device. Thus, a communication path is established between the HDCP source and HDCP sink that only authorized devices can access.

In order for an HDCP compliant source to successfully transmit protected content to one or more HDCP compliant sinks through an HDCP compliant repeater, a more involved authentication process must first occur. To affirm the downstream sinks to the upstream sources, the HDCP repeater must pass along the KSVs of each downstream receiver to the upstream source. The HDCP source checks these KSVs against an HDCP Revocation List maintained by DCP, LLC ("HDCP blacklist") in order to determine if each of the downstream sinks are licensed to receive the protected content. If all the downstream sinks are determined to be licensed to receive the protected content, the upstream source transmits the protected content to the HDCP repeater. It is the responsibility of the HDCP repeater to then establish and periodically manage authenticated links with each of its connected HDCP receivers.

While HDCP offers the benefit of encrypted content transmission, the required authentication protocol increases the switching delay in video distribution networks. Each time a new path for video distribution is desired, the links forming those paths must be authenticated. For example, when a user desires to switch to a different video source, not only must the new video source authenticate with the repeater, but the repeater must also reauthenticate with the video sink. Increased switching times are disrupting and bothersome to users. In complex video distribution systems with multiple layers, this problem is even more amplified. Additionally, because HDCP scheme operates under the surface, most users do not realize that the increased time is the result of copy protection schemes and often unfairly attribute them to the individual components in the video distribution network.

An additional factor in the high switching delay in video distribution units, is caused by the need for processing in video distribution networks. Scalers are employed to change the resolution or refresh rate of distributed video and are common components in video distribution networks, either as separate components or integrated into other components in the network. Each time a video scaler receives audiovisual data at a new resolution, there is a delay before the scaler outputs any new video. The video scaler must load data and format before outputting scaled video. This is known as achieving video lock. During a switching event, each scaler in the distribution path must achieve video lock in succession. In complex video distribution systems with multiple layers, this delay is amplified.

Additionally, dependent on the characteristics of the display, viewers may be subjected to disrupting video artifacts or snow during switches. Manufacturers handle disrupted video in different ways. Some displays may show snow when video is disrupted. Other may display pixilated images or ghost images. Many viewers find these display responses disturbing and lead some to believe that there is a problem with their equipment when no such problem exists. Users may experience the authentication process as a delayed period with snow or disorienting video artifacts.

There is now a need for an improved switcher for use in a video distribution network.

SUMMARY OF THE INVENTION

It is to be understood that both the general and detailed descriptions that follow are exemplary and explanatory only and are not restrictive of the invention.

DISCLOSURE OF INVENTION

Principles of the invention provide a device and method for reducing the switching time of a video distribution network by maintaining an authenticated security protocol link on a downstream connection of a switcher device. For example, in a first aspect of the invention, a switcher device comprises at least two input boards, a multiplexer and an output board. Each of the at least two input boards are configured for receiving audiovisual data from a video source over a security protocol link. The multiplexer is communicatively coupled between the at least two input boards and a transmitter board and configured for dynamically routing audiovisual data from the at least input boards to the transmitter board. The output board is configured for transmitting audiovisual data to a video sink over a security protocol link and maintaining the security protocol link as authentic.

According to a second aspect of the invention, a switcher device comprises at least two input boards, a multiplexer board and an output board. Each of the at least two input boards is configured for receiving audiovisual data from a video source over an HDCP link. The multiplexer board comprises a multiplexer communicatively coupled between the at least two input boards and an output board and configured for dynamically routing audiovisual data from the at least two input boards to the output board and a processing unit in communication with the multiplexer and the output board and configured for transmitting a switch signal to the multiplexer and a prepare signal to the transmitter board prior to a switching event. The output board is configured for transmitting audiovisual data to a video sink over and HDCP link and comprises a receiver configured for receiving audiovisual data routed from the multiplexer, a scaler configured for converting audiovisual data received via the multiplexer to video to a native resolution of the video sink, generating video timing data at the native resolution of the video sink during the switching event and generating image content data for a period of time until achieving video lock in response to receiving the prepare signal, and a transmitter configured for encrypting and transmitting generated audiovisual data to the video sink over an HDCP interface and maintaining an authenticated interface with the video sink by outputting continuous audiovisual data during the switching event.

According to a second aspect of the invention, an output board for a switcher device is configured for transmitting audiovisual data to a video sink over a security protocol link. The output board comprises a receiver, a scaler and a transmitter. The receiver is configure for receiving audiovisual data. The scaler is configured for converting the audiovisual data to a native resolution of the video sink and configured for generating audiovisual data during a switching event. The transmitter is configured for encrypting and transmitting the output of the scaler and further configured for maintaining an authenticated interface with the video sink.

According to a fourth aspect of the invention, a method for reducing switching delay when switching sources in a video distribution network comprises the steps of receiving audiovisual data at a first input board from a first video sink over a security protocol link, routing audiovisual data from the first input board to an output board, transmitting audiovisual data from the output board to a video sink over a security protocol link, receiving a user control signal to switch to a second video source, generating video timing data at the output board during a delay between receiving audiovisual data from the first input board and receiving audiovisual data from the second input board to maintain authenticity of security protocol link between the output board and the video sink, receiving audiovisual data at a second input board from a second video sink over a security protocol link, routing audiovisual data from the second input board to the output board; and transmitting audiovisual data from the output board to the video sink over a security protocol link.

According to a fifth aspect of the invention, a computer program product for reducing the switching time in a video distribution network, the computer program product comprises a computer readable storage medium having computer readable code embodied therewith. The computer readable program code comprises computer readable program code configured to detect a user control signal to switch from a first video source to a second video source, transmit a prepare signal to a processing unit of an output board in response to the detection of the user control signal, detect the prepare signal, instruct a scaler to generate audiovisual data in response to the detection of the prepare signal, cease routing audiovisual data from a first video source to the output board, continue generating video timing data at the scaler of the output board, begin routing audiovisual data from a second video source to the input board, cease generating image content data upon achieving video lock.

The present invention seeks to overcome or at least ameliorate one or more of several problems, including but not limited to: reducing the switching delay of a video distribution network transmitting protected video.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
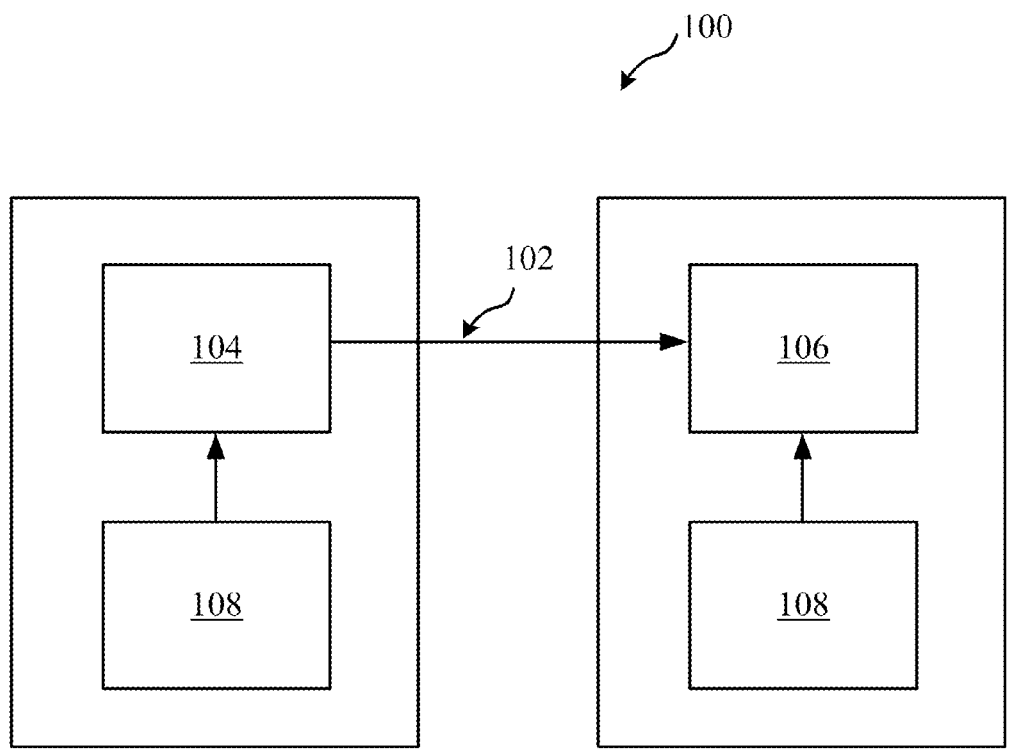

FIG. 1 is a block diagram of an illustrative High-Bandwidth Digital Content Protection (HDCP) system.

Figure 2:
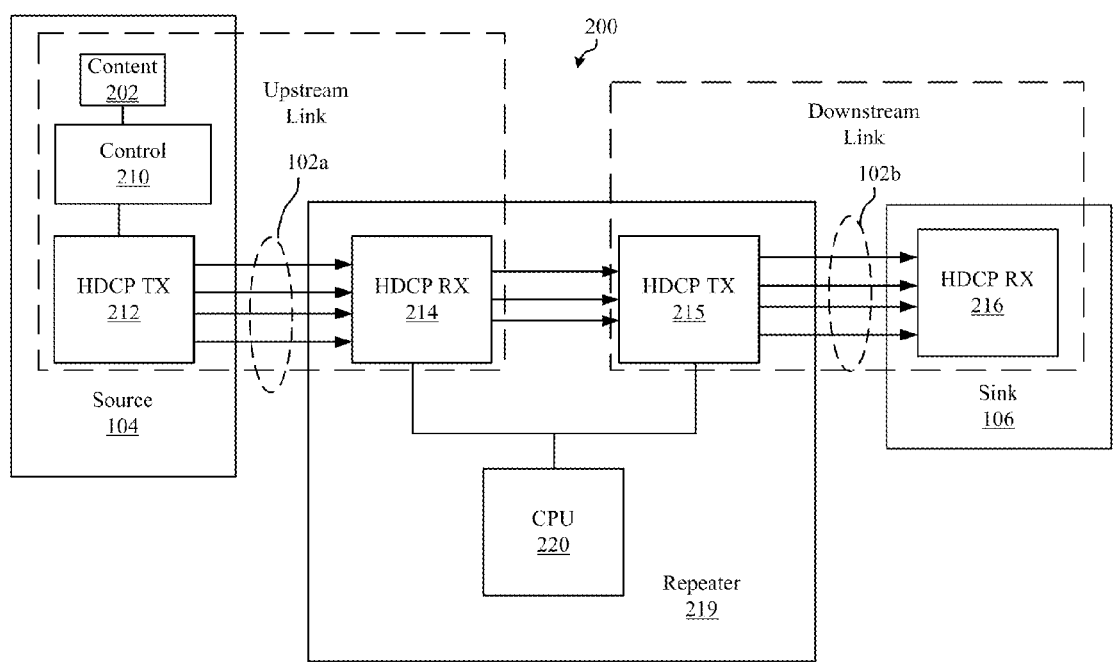

FIG. 2 is a block diagram of an illustrative HDCP system wherein two or more HDCP devices are interconnected through at least one HDCP-protected Interface.

Figure 3:
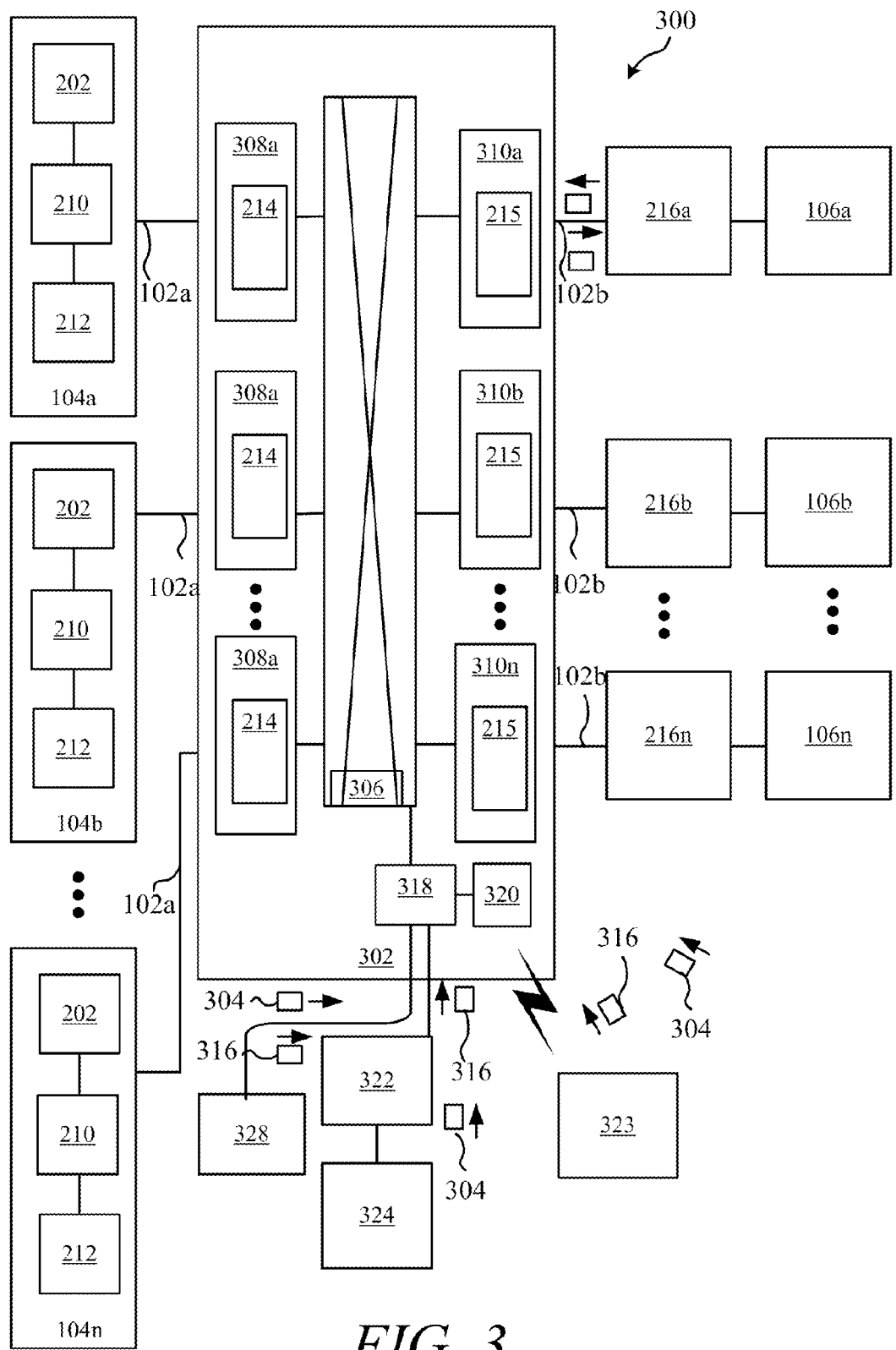

FIG. 3 is a block diagram of the inventive switcher device, according to an illustrative embodiment of the invention.

Figure 4:
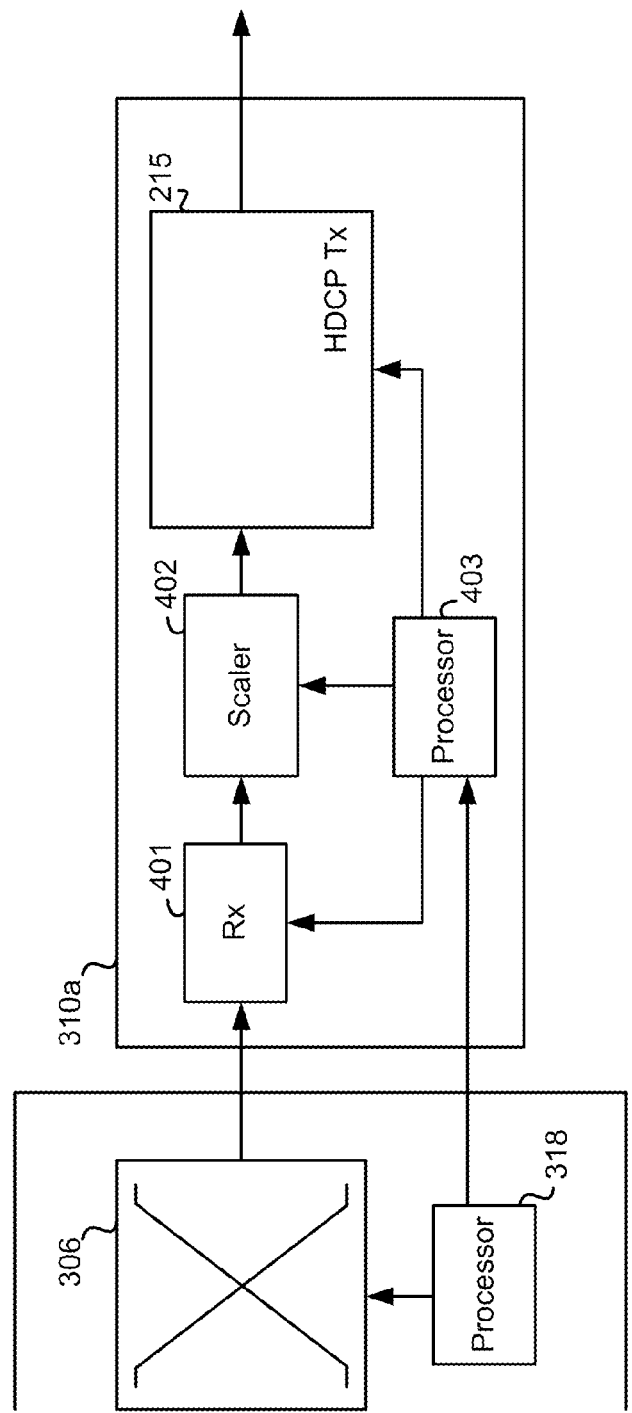

FIG. 4 is a block diagram of the switcher device shown in FIG. 3, according to an illustrative embodiment of the invention.

Figure 5:
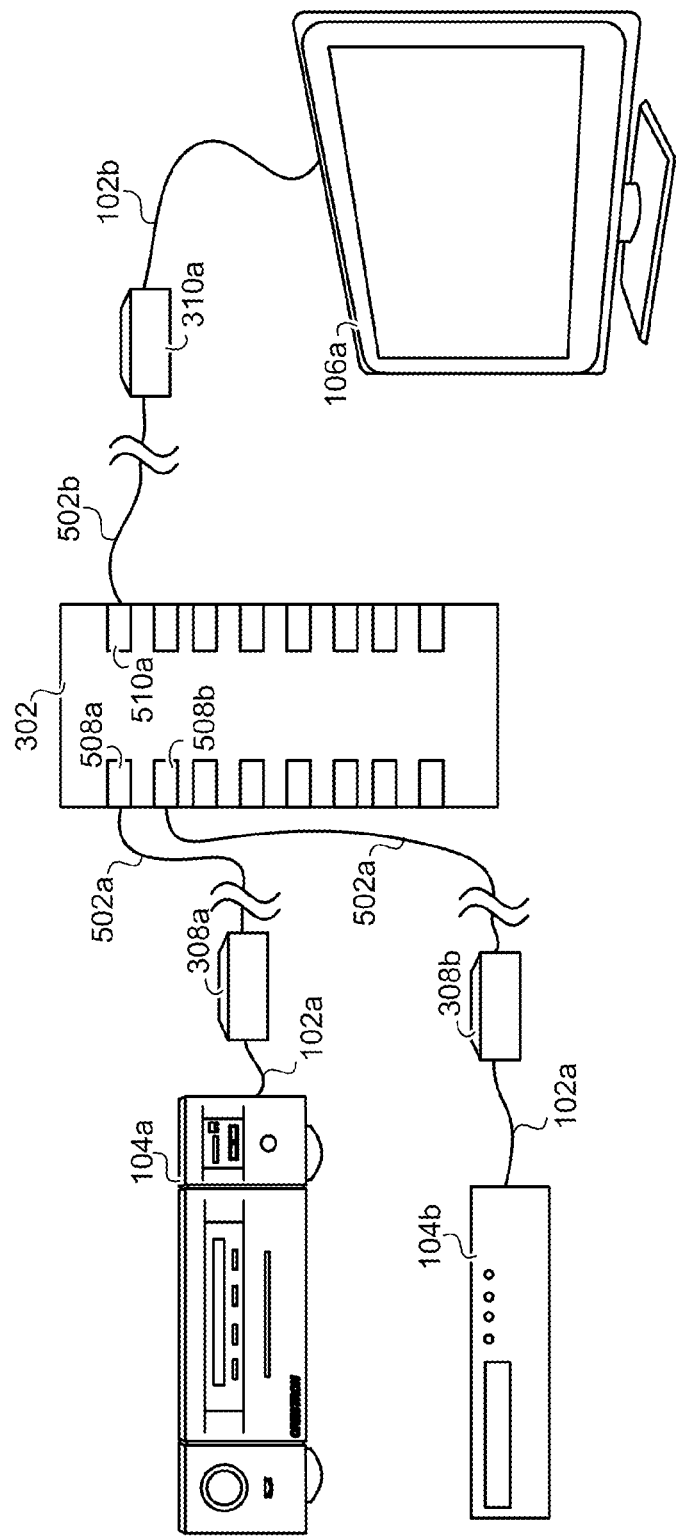

FIG. 5 shows a video distribution network, according to an illustrative embodiment of the invention.

Figure 6:
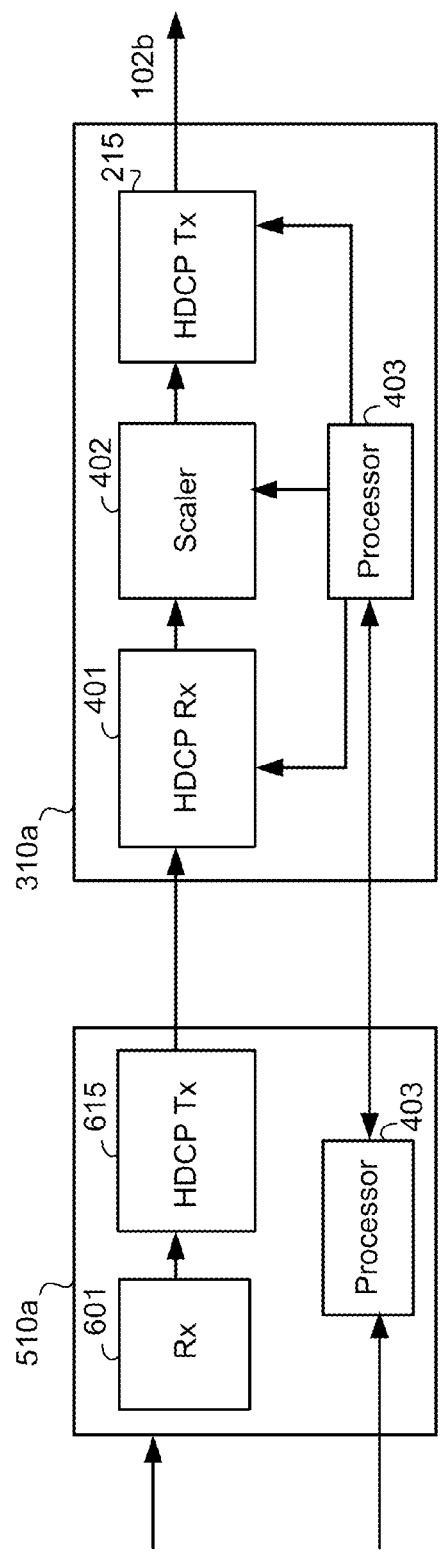

FIG. 6 is a block diagram of the output board shown in FIG. 5, according to an illustrative embodiment of the invention.

Figure 7:
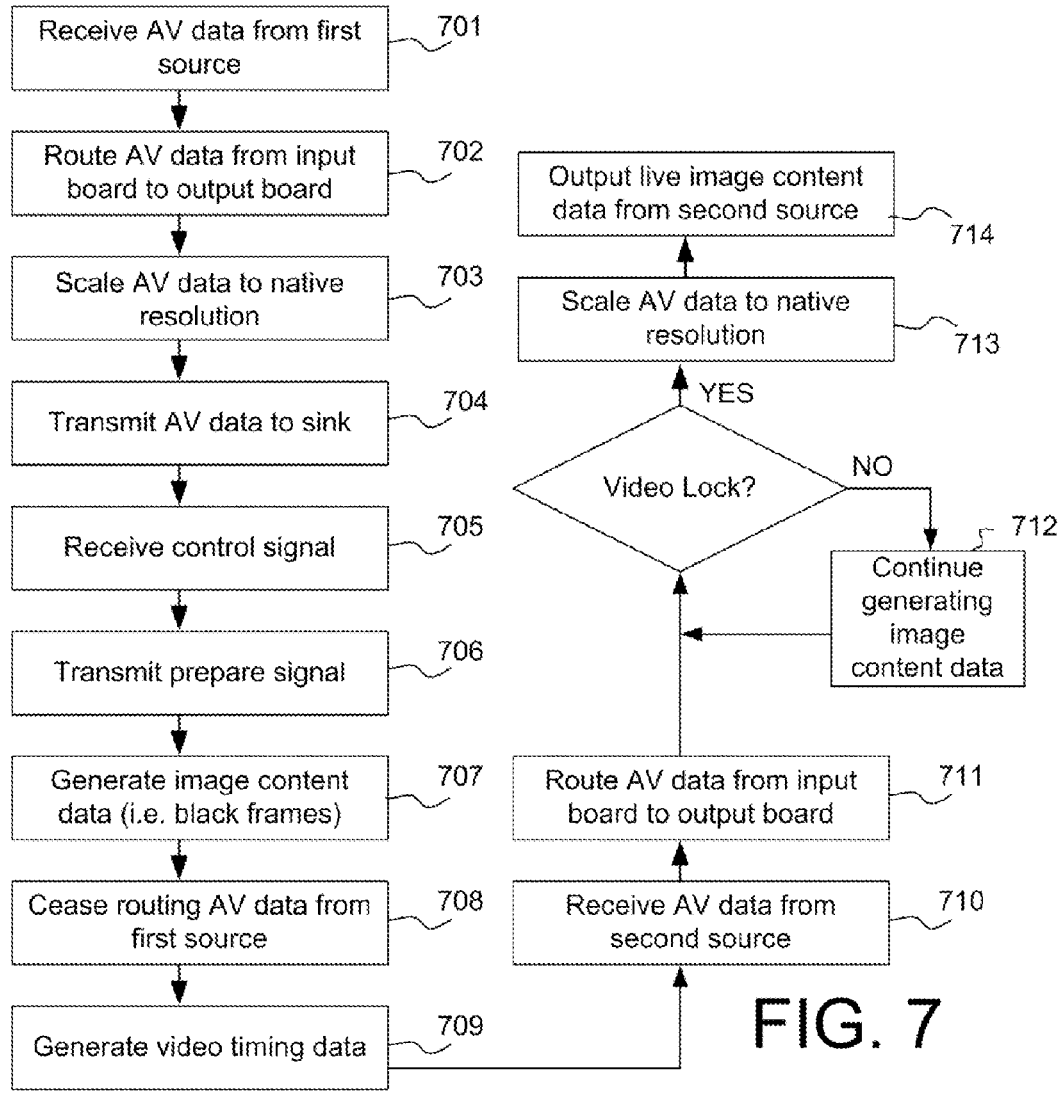

FIG. 7 is a flowchart showing illustrative steps to perform a method for reducing the switching time in a video distribution network, according to an illustrative embodiment of the invention.

LIST OF REFERENCE NUMBERS FOR THE MAJOR ELEMENTS IN THE DRAWING

The following is a list of the major elements in the drawings in numerical order.
- 100 High Bandwidth Digital Content Protection system
- 102 collectively interface cable or link of 102a, 102b
- 104 collectively the source of 104a, 104b, . . . , 104n
- 106 collectively the sink/display of 106a, 106b, . . . , 106n
- 108 secret device keys
- 200 High Bandwidth Digital Content Protection system
- 202 HDCP content or audiovisual data
- 210 control function
- 212, 215 HDCP transmitter
- 214, 216 HDCP receiver
- 219 repeater
- 220 central processing unit
- 300 video distribution network
- 302 switcher device
- 304 control signal
- 306 multiplexer
- 308 collectively the input board of 308a, 308b, . . . , 308n
- 310 collectively the output board of 310a, 310b, . . . , 310n
- 316 user control signal
- 318 switcher processing unit
- 320 transceiver
- 322 control system
- 323 user interface device, specifically wireless/mobile device
- 324 user interface device
- 401 receiver
- 402 output scaler
- 403 output processing unit
- 502 collectively interface cable or link of 502a, 502b, . . . , 502n
- 508 collectively the extended reception board of 508a, 508b, . . . , 508n
- 510 collectively the extended transmission board of 510a, . . . , 510n
- 601 receiver
- 615 HDCP transmitter
- 701 (step of) receiving audiovisual data at a first input board via an HDCP link
- 702 (step of) routing audiovisual data from the first input board to an output board
- 703 (step of) scaling the audiovisual data to a native resolution of a video sink
- 704 (step of) transmitting audiovisual data to the video sink via an HDCP link
- 705 (step of) receiving a control signal to switch from first output board to second output board
- 706 (step of) transmitting a prepare signal to the output board
- 707 (step of) generating image content data during switching delay
- 708 (step of) ceasing routing audiovisual data from the first input board
- 709 (step of) generating video timing data during switching delay
- 710 (step of) receiving data at a second input board via an HDCP link
- 711 (step of) routing audiovisual data from the second input board to an output board
- 712 (step of) continuing to generate image content data after switching delay
- 713 (step of) scaling the audiovisual data to a native resolution of a video sink
- 714 (step of) transmitting live audiovisual data to the video sink via an HDCP link

DETAILED DESCRIPTION OF THE INVENTION

Mode(s) for Carrying Out the Invention

Definitions

Authorized device—An HDCP device that is permitted access to HDCP content. An HDCP transmitter may test if an attached HDCP receiver is an authorized device by successfully completing the first and, when applicable, second part of the authentication protocol. If the authentication protocol successfully results in establishing authentication, then the other device is considered by the HDCP transmitter to be an authorized device.

Downstream—Term used as an adjective to refer to being towards the sink/display of the HDCP content stream.

DVI—Short for Digital Video (or Visual) Interface, a digital interface standard created by the Digital Display Working Group (DDWG) to accommodate both analog and digital monitors.

HDCP—short for High-Bandwidth Digital Content Protection, a specified method developed by Digital Content Protection, L.L.C. (DCP) for protecting copyrighted digital content as it travels across connection interfaces and protocols such as DisplayPort (DP), Digital Video Interface (DVI), High-Definition Multimedia Interface (HDMI).

HDCP content—consists of audiovisual content that is protected by the HDCP system. HDCP content includes the audiovisual content in encrypted form as it is transferred from an HDCP transmitter to an HDCP receiver over an HDCP-protected Interface.

HDCP device—Any device that contains one or more HDCP-protected interface ports and is designed in adherence to HDCP.

HDCP Encryption—The encryption technology of HDCP when applied to the protection of HDCP content in an HDCP system.

HDCP-protected Interface—An interface for which HDCP applies.

HDCP-protected Interface Port—A connection point on an HDCP Device that supports an HDCP-protected Interface.

HDCP receiver—An HDCP device that can receive and decrypt HDCP content through one or more of its HDCP-protected interface ports.

HDCP repeater—An HDCP device that can receive and decrypt HDCP content through one or more of its HDCP-protected interface ports, and can also re-encrypt and emit the HDCP content through one or more of its HDCP-protected interface ports. An HDCP repeater may also be referred to as either an HDCP receiver or an HDCP transmitter when referring to either the upstream side or the downstream side, respectively.

HDCP transmitter—An HDCP device that can encrypt and emit HDCP content through one or more of its HDCP-protected interface ports.

HDMI—Short for High-Definition Multimedia Interface, an industry-supported, uncompressed, all-digital audio/video interface.

Upstream—Term used as an adjective to refer to being towards the source of the HDCP content stream. The antonym of "downstream," defined above.

FIGS. 1 and 2 illustrate examples of High-Bandwidth Digital Content Protection (HDCP) systems 100, 200. Referring to FIG. 1, the HDCP system 100 encrypts the digital content transmission between a video source 104 (set-top box, computer, DVD, etc.) and a sink or display 106 (Liquid Crystal Display, television, etc.) via an interface 102 such as a Digital Video Interface (DVI), a High-Definition Multimedia Interface (HDMI), and a DisplayPort interface.

FIG. 2 illustrates an HDCP system 200 wherein two or more HDCP devices 104, 106 are interconnected through an HDCP repeater and two HDCP-protected Interfaces 102a, 102b (collectively 102). Each point-to-point HDCP link involves one HDCP transmitter 212, and one HDCP receiver 214. As such, the HDCP repeater 219 must decrypt the HDCP content at the HDCP receiver 216 on each of its inputs. The repeater 219 must then re-encrypt the data with an HDCP transmitter 215 on each of its outputs. The repeater 219 must inform the upstream device of its downstream connection, but it is the repeater's 219 responsibility to maintain those connections. The audiovisual content protected by HDCP, HDCP content 202, flows from an upstream content control function 210 into the HDCP system 200 at the most upstream transmitter 212. From there, the HDCP content 202, encrypted by the HDCP system 200, flows through a tree-shaped topology of HDCP receivers 214 over HDCP-protected Interfaces 102. Before sending data, the each transmitter 212, 215 checks that the HDCP receivers 214, 216 are authorized to receive the HDCP content 202. If so, the transmitter 212 encrypts the HDCP content 202 to prevent eavesdropping as it flows to the receiver 216. A central processing unit 220 includes firmware to process the data 202 and other information and control.

Device manufacturers typically buy HDCP chips from a DCP-licensed silicon vendor. These chips usually also provides Transition Minimized Differential Signaling (TMDS) encoders or decoders and other HDMI-specific features. Every transmitter 212 will have at least one HDCP transmitter chip and every receiver 216 will have at least one HDCP receiver chip. The HDCP transmitters 212, and receivers 216 frequently require a microprocessor to implement the authentication state machines. Transmitters 212, 215 are HDMI transmitters.

The Authentication and Encryption Protocols

HDCP authentication consists of three parts:

Part One: The source 104 authenticates with the sink/display 106 connected to its output. If successful, encryption is enabled and audiovisual (A/V) content transmission begins.

Part Two: This part is used if the downstream device is a repeater 219. The repeater 219 authenticates with the devices connected to its output(s) and passes the HDCP tree topology information up to the source 104. The source 104 is the root and sinks/display 106 are the leaves, while repeaters 219 make up the branches of the tree.

Part Three: The source 104 performs periodic checks with the sink/display 106 to ensure that encryption is in sync. As mentioned above, it is the repeater's responsibility to maintain its downstream connections. If any part of authentication fails or any revoked devices are found in the HDCP tree, the transmitter 212 must stop sending protected content and authentication starts over at Part One.

Authentication Part One

Part One of authentication is a key exchange protocol. The transmitter 212 and receiver 216 calculate a common secret session key 108 to be used for encryption. If they cannot come up with the same key value, authentication fails and the receiver 216 will not be able to decrypt the content 202. The session key is derived from each device's private key according to the following protocol:

First the transmitter 212 generates a random number "An" and sends it to the receiver 216. This value will be used later in the protocol. The devices 104, 106 then exchange KSVs. The receiver 216 also sends its REPEATER bit, a flag that indicates whether or not it is part of a repeater. Now each device 104, 106 has the other device's Key Selection Vector (KSV). Each device 104, 106 uses the other device's Key Selection Vector to select twenty of its own keys. The forty bits in the KSV correspond to the indexes of each of the forty private keys. For every set bit in the received KSV, the local private key at that index is selected. All KSVs have twenty set bits, so twenty keys are selected. The devices 104, 106 then each add up their selected keys to come up with the sums Km and Km', for the transmitter and receiver, respectively 212, 216. For authentication to succeed, Km and Km' must match. Each device 104, 106 tells the other which of its own unique, secret keys to select, and they both come up with the same sum. That may seem counter-intuitive, but it is the aforementioned mathematical relationship between the keys and the KSVs that accounts for this behavior. The source 104 must determine whether Km and Km' match. However, they are secret values, so they cannot be transmitted over the interface cable 102 for the DDC. Each device 104,106 feeds Km (or Km'), the random number "An", and the REPEATER bit into their respective HDCP cipher engines in order for the transmitter 212 to verify that the values match without sending them across the cable 213 for everyone to see. The resulting data stream is split into three values:

R0/R0': This return value may be shared between the devices 104, 106 and is used to verify that authentication was successful.

Ks/Ks': This value is kept private and is used as the encryption session key for the HDCP cipher.

M0/M: This value is also kept private and is used in Part Two of authentication (if the downstream device is a repeater 219).

The receiver sends R0' to the transmitter 212, which compares it against its' own R0 value. If they match, that proves that the sums Km and Km' matched, and authentication is successful. Furthermore, the session keys Ks and K match, so the receiver 214 will be able to decrypt the content encrypted by the transmitter. If Part One of authentication was successful, the transmitter 212 may begin sending encrypted content 202. If the downstream device is a repeater 219, the repeater 219 must authenticate with its own downstream device according to the same protocol. The transmitter 212 then starts a 5-second timer to allow for the repeater 219 to perform Part Two of authentication. If Part Two fails or times out, authentication fails and the transmitter 212 must stop transmitting the protected content 202.

Authentication Part Two

Part Two of authentication only occurs if the downstream device is a repeater 219. The purpose of Part Two is to inform the source 104 of all downstream devices and the HDCP tree depth. The source 104 uses this information to ensure that the tree topology maximums have not been exceeded and to ensure that none of the downstream devices have been revoked by DCP. The repeater 219 first assembles a list of the KSVs of all downstream devices, as well as the device count and the tree depth. The repeater 219 then passes this information up to the source 104. To ensure that this information hasn't been tampered with during transmission, each device takes this list, appends its secret value M0/M0' from Part One, and calculates a SHA-1 hash of the whole thing. The transmitter 212 reads the hash result from the receiver 214 and compares it against its own. If they match, Part Two of authentication is successful.

Authentication Part Three

All HDCP devices are considered authenticated after successful completion of Authentication Parts One and Two. Part Three is simply a link integrity check to ensure that encryption is in sync between all transmitter/receiver pairs 212, 214, 215, 216 in the tree. To support link integrity checks, the return values Ri and Ri' roll over to a new value every 128 frames. Recall that the initial Ri values R0 and R0' were generated during Part One of authentication. Every two seconds, the transmitter 212 compares the receiver's 216 Ri' value against its own Ri value to see if they match. If they don't, encryption is out of sync and the receiver 216 cannot correctly decrypt the content 202. The user will see a scrambled or "snowy" image on the screen. In this case the transmitter 212 must restart authentication from the beginning.

Inventive Embodiments

The three part authentication process increases switching delay when switching sources in a video distribution network. Switching delay is the delay between switching an aspect of incoming audiovisual data to a video sink, such as audiovisual data source, audiovisual data resolution and audiovisual data refresh rate, and the incoming audiovisual data being displayed on the video sink. Not only must devices authenticate the HDCP link before video transmission, each time an upstream HDCP link is switched, downstream HDCP links may be affected as well because audiovisual data transmission to downstream links is interrupted. Each time video transmission is interrupted between an HDCP transmitter and an HDCP receiver, the HDCP link fails Part Three of the authentication process and the authentication process must be restarted from Part One. This includes downstream connections that were previously authenticated with each other.

For example, in a video distribution network comprising a first HDCP-compliant video source and a second HDCP compliant video source connected to an HDCP compliant video sink via an HDCP compliant video switcher, when the video source transmitting HDCP content to the video sink is switched from the first video source to the second video source, not only must the second video source authenticate with the video switcher, but the downstream link between the video source and the video switcher must also be reauthenticated due to the disruption in video transmission. This despite the fact that the HDCP link between the video source and the video switcher was already authenticated. This issue becomes increasingly burdensome in expansive video distribution networks with many layers (i.e. a large tree topology).

Additionally, when video transmission is interrupted between an HDCP transmitter and an HDCP receiver due to upstream switching and HDCP authentication, any downstream video scalers must lock back on the incoming audiovisual data before outputting any scaled audiovisual data. This introduces delay in addition to the delay introduced by the HDCP authentication process. For example, each time video transmission to a sink is interrupted, video scaler internal to the sink will take anywhere between two and ten seconds to lock onto the incoming audiovisual data again. Those skilled in the art will recognize that scaler operation is unpredictable and varies due to hardware and firmware specification. Often, video scalers included in video sinks are not optimized for reducing switching delay. Also unpredictable is video sink response while embedded video scalers achieve video lock. Presented with interrupted video, the video sink may display snow, pixilated images, video artifacts or a blank screen while internal scaler achieves video lock dependent on video sink manufacturer.

Because the HDCP authentication process operates in the background, often unknown to the user, long switching delays are unfairly blamed on video distribution components. Users may experience the authentication process as a delayed period with snow or disorienting video artifacts. This could result in undeserved user dissatisfaction with the manufacturer of the components in the video distribution network.

As will be explained below, the present invention discloses systems, apparatuses and methods for reducing the switching time in a video distribution network. The present invention discloses maintaining authentication of downstream link during a switching discontinuity, minimizing the interruption of video transmission resulting from switching events. By outputting continuous video timing data to a sink over a downstream HDCP link, even during switching discontinuities, the downstream HDCP link satisfies the maintenance check in step three of HDCP authentication. Accordingly, steps one and two of the HDCP authentication protocol need not be repeated. Additionally, as a result of maintaining the authentication of the HDCP link by outputting continuous video timing data during switching discontinuities, video scalers downstream of the HDCP link (i.e. internal video sink scalers) will not lose video lock with the incoming video stream thereby reducing delay times further. Finally, by outputting black frames of image data, the content displayed during switching events is controlled.

FIG. 3 is a block diagram of an inventive switcher device configured for reducing switching time in a video distribution network. The video distribution network 300 is an HDCP system and includes at least one source 104a, 104b, . . . , 104n (collectively 104) and at least one sink or display 106a, 106b, . . . , 106n (collectively 106). At least two sources 104 include an HDCP transmitter 212, such as an HDMI transmitter, configured to transmit audiovisual data comprising video timing data and image content data to the at least one sink 106. Each source 104 further includes a graphic generator (not shown) to generate a graphic or image. The HDCP transmitter 212 receives the HDCP content 202 from an upstream content control function 210.

At least one sink includes an HDCP receiver, such as an HDMI receiver. The source 104 determines via the authentication process what content can be viewed, recorded, and shared based on sinks/displays 106 that support HDCP and sinks/displays 106 that does not support HDCP. The output of the source 104 is connected to an input board 308 for a switcher device 302 through their HDCP-protected interfaces 304 and the switcher device 302 serves as an HDCP repeater for HDCP compliant content. An output board 310 for the switcher device 302 is connected to the input of the sink/display 106 via another interface 102b. The interface 102a, 102b for the input board and the output board of the switcher device 302 may be an HDMI cable that carries a variety of signals such as one or more Transition Minimized Differential Signaling (TDMS) data signals, Digital Display Channel (DDC), Hot Plug Detect (HPD), and RxSense. As will be described later, the interface 102a, 102b for the input board and output board of the switcher device 302 may also be a combination of one or more shielded twisted pairs (STP) and one or more unshielded twisted pairs (UTP), such as DigitalMedia (DM) cable available from Crestron Electronics, Inc. of Rockleigh, N.J.

When an HDCP source 104 (more specifically source 104a) detects an RxSense signal from an HDCP compliant sink/display 106 (more specifically sink/display 106a), the source 104a will transmit HDCP content 202 to the sink/display 106a after the authentication process is successful.

The audiovisual data 202 is encoded into three data channels. These channels and a TMDS clock are carried over four differential pairs from the source 104 to the sink/display 106. The DDC is a communications interface similar to I2C. This interface provides two-way communication in a master-slave relationship. The upstream device 104 is the DDC master and the downstream device 106 is the DDC slave. The HDCP receiver indicates its presence to the HDCP transmitter with the HPD signal. The HDCP transmitter 212 is the HDCP Device most upstream, and receives the HDCP content 202 from an upstream content control function 210.

The switcher device 302, functioning as an HDCP repeater, is a fully modular and expandable matrix switcher offering low-latency digital video and audio switching, and HD lossless multi-room signal distribution, for all types of A/V sources. The switcher device 302 may be a Crestron Digital Media Switcher available from Crestron Electronics, Inc. of Rockleigh, N.J.

The Crestron Digital Media Switcher is field-configurable to handle, but not limited to, eight, sixteen, and thirty-two audiovisual sources of virtually any type via input boards. The outputs are also field-configurable to provide, but not limited to, eight, sixteen, and thirty-two room outputs and/or HDMI outputs in a single chassis. The chassis comprises slots for the insertion of input and output boards. As will be described later, the input boards and output boards may be input boards and output boards, respectively, of the switcher device 302. Additionally, the input boards and output boards may operate external of the chassis of the Digital Media Switcher and be coupled to the Digital Media Switcher via intermediate cards inserted into slots in the chassis.

The switcher device 302 includes a multiplexer 306 coupled in-between the at least one input board 308a, 308b, 308n (collectively 308) and at least one output board 310a, 310b, 310n (collectively 310). The multiplexer 306 may be, but is not limited to, a mechanical switch, electrically operated switch, solid state relay, latching relay, reed relay, Single Pole Single Throw (SPST) relay, Single Pole Double Throw (SPDT) relay, Double Pole Single Throw (DPST) relay, and Double Pole Double Throw (DPDT) relay.

The multiplexer 306 transmits an audiovisual data signal 202 from one of the at least two input boards 308 to a first output board 310a. The multiplexer 306 dynamically switches between the first input board 308a and at least a second input board 308b based on a user control signal 316 that selects either the first video source 104a or second video source 104b to be displayed on the video sink 106a. The output board 310 is coupled to the at least one sink/display 106 via an interface cable 102b. The interface cable 102b may be an HDMI cable. The switcher 302 further includes a processing unit 318 coupled to the multiplexer 306. The processing unit 318 includes at least one transceiver 320 for bidirectional communications with an end user device (e.g. 324, 326), in part, to receive the user control signal 316. The end user device 324, 326 transmits the user control signal 316 from a touch panel display 324 via a control system 322. An end user may also transmit the user control signal 316 from a wireless device 326. Software tools 328 may be loaded onto the wireless device and/or touch panel 324 to assist the end user in selecting a desired source 104 and the sink 106. In response to the user selecting the desired source 104 for the sink 106, the end user device transmits the user control signal 316 to the switcher device 302.

Upon the user selecting the desired source 104 for the at least one desired display 106, the source 104 will authenticate with the switcher device 302 as described above. The switcher device 302 will authenticate with the at least one desired downstream sinks 106 as described above. Once the authentication is complete, the source 104 will transmit the HDCP content (i.e. HDCP protected audiovisual data) via the HDCP link between the source and the repeater. This HDCP link comprises the HDCP transmitter 212 of the source, an HDCP interface, and an HDCP receiver 214 of the first input board 308a. The HDCP receiver of the input board 308a receives the HDCP content and provides the audiovisual data unencrypted to the multiplexer 306. The multiplexer 306, dependent on the user control signal 316 routes the unencrypted audiovisual data to the desired output board 310. The output board 310 processes and encrypts the audiovisual data and then transmits the HDCP content to the desired sink 106 over an HDCP link between the output board 310 and the video sink 106. The HDCP link between the output board 310 and the video sink 106 comprises an HDCP transmitter 215 of the output board, HDCP interface and HDCP receiver of the video sink.

The multiplexer 306 is configured to dynamically route the audiovisual data according to the user control signal received at the processing unit 318. For example, a user viewing content from a first source 104a, such as a cable tuner, may desire to switch to a second source 104b, such as a Blu-ray disc player. When the multiplexer 306 switches from routing audiovisual data from the first source to routing audiovisual data from the second source 104b, the output board 310 experiences a switching delay as a result of the delay caused by upstream HDCP authentication and multiplexer 306 operation. A similar switching discontinuity may also result from a change in resolution or change in refresh rate of the received audiovisual data.

The output board 310 of the inventive switcher device 302 is configured to continuously output audiovisual data including video timing data and image content data during switching discontinuities such that the HDCP link between the output board 310 and the video sink 106 remains authenticated during the switch and an aesthetically pleasing display is shown during said switch. For example, the output board 310 may output black frames of audiovisual data during switching discontinuities. Switching delay in the video distribution network 300 is minimized by maintaining the authentication of the HDCP link by continuously outputting video timing data. Additionally, by continuously outputting video timing data to the video sink during switching discontinuities, video lock is maintained in video processing devices, such as scalers, downstream from the output board 310 (i.e. scalers internal to video sink), thereby further minimizing switching delay.

FIG. 4 is a block diagram of a portion of the switcher device 302 shown in FIG. 3. The output board 310a further comprises a receiver 401, an output scaler 402, an output processing unit 403 and an HDCP transmitter 215. The receiver 401 is configured to receive audiovisual data routed from the first input board 308a or second input board 308b via the multiplexer 306. As described below, in an embodiment of the invention, the receiver 401 is an HDCP receiver configured for receiving HDCP encrypted content.

The output scaler 402 receives the audiovisual data from the receiver 401 and is configured to convert the received audiovisual data to a native resolution of the video sink 106. The output board 310 may receive the native resolution of the video sink 106 via an EDID channel. Those skilled in the art will recognize that the operation of video scalers embedded in end user devices are idiosyncratic depending on manufacturer and may perform substantially below par, resulting in poor video quality and delayed performance. Advantageously, by converting to the native resolution of the video sink 106, video processing is minimized in downstream embedded video scalers.

In an embodiment of the invention, the output scaler 402 of the output board 310 is configured for operating in a pass through mode in which the output scaler detects the resolution of the incoming audiovisual data via the video timing data. The output scaler passes the incoming audiovisual data through to the HDCP transmitter if the audiovisual data is routed to the output board already at a native resolution of the video sink.

The output scaler 402 is further configured to generate audiovisual data comprising video timing data and image content data during switching discontinuities. For example, during a switching discontinuity between receiving audiovisual data from a first source 104a and audiovisual data from a second source 104b, the output scaler 402 may output black frames. By outputting a continuous stream of audiovisual data, more specifically video timing data, to the HDCP transmitter 215, the HDCP link between the output board 310 and the source is maintained as authenticated during the switch. In addition, by outputting black frames of audiovisual data, more specifically image content data, the end user experiences a clean transition from the first source 104a to the second source 104b. In other embodiments, the output scaler 402 may generate frames of image content data of a color other than black or may generate image content data comprising an image, such as a corporate logo.

Prior to outputting audiovisual data from the second source 104b, the output scaler 402 must receive a sufficient amount of audiovisual data from the second source 104b. This is known as achieving video lock. Following a switching discontinuity, the output scaler 402 is further configured to generate image content data until video lock is achieved. By generating image content data until the output scaler 402 achieves video lock, the user is presented with a clean transition during switching events.

The output scaler 402 is configured to operate in a free run mode by automatically generating video timing data during switching discontinuities.

The output scaler 402 is configured to generate image content data in response to control signals from the output processing unit 403. Upon receiving the user control signal to switch the source of audiovisual data and prior to transmitting a switching signal to the multiplexer 306, the switcher processing unit 318 transmits a prepare signal to the output processing unit 403. The output processing unit 403 in turn instructs the output scaler 402 to generate black frames of audiovisual data.

The HDCP transmitter 215, such as an HDMI transmitter, converts and encodes the audiovisual data output from the output scaler 402 to one or more TDMS signals for transmission to the video sink 106 over the HDCP interface. In an embodiment of the invention, the HDMI transmitter comprises an HDCP transmitter chip and may further comprise TMDS encoders or decoders and other HDMI-specific features. The audiovisual data is reencrypted in accordance with the shared secret from authentication between the HCDP repeater and the HDCP sink. The HDCP transmitter 215 receives the native resolution and the native refresh of the sink via a Display Data Channel (DDC) of the interface. The HDCP interface between transmitter and the HDCP receiver may be HDMI.

FIG. 5 shows the switcher device 302 in a video distribution network 300, according to a further embodiment of the invention in which the output board 310 is contained in a housing external to the switcher device 302. The video distribution network 300 comprises an extended transmission board 510 coupled between the multiplexer 306 and the output board 310. The video distribution network 300 further comprises an extended reception board 508. In an embodiment of the invention, the extended reception board 508 and extended transmission board 510 may be modular input and output boards, respectively, configured to be inserted into the switcher device 302. As described below, the extended transmission and reception boards allow for extended cable lengths which increases the functionality of the video distribution network 300. For example, the output board 310 may be collocated in the same area as its corresponding video sink 106. The switcher device 302 may be remotely located in a central location or out of view, such as in an equipment closet. Similarly, the first input board 308a and second input board 308b may be collocated with the first video source 104a and the second video source 104b, respectively.

In this embodiment, the output board 310 is configured for receiving encrypted audiovisual data via an HDCP link. The extended transmission board 510 is communicatively coupled between the multiplexer 306 and the output board 310 and is configured for encrypting the audiovisual data routed by the multiplexer 306 and transmitting the encrypted audiovisual data to the output board 310 via an HDCP link. The HDCP link comprises an HDCP transmitter 615 of the extended transmission board 510, an HDCP interface 502 and an HDCP receiver 401 of the output board 310. The HDCP interface 502 may be one or more pairs of twisted cable or fiber optical cable, such as DigitalMedia cable available from Crestron Electronics, Inc. of Rockleigh N.J. Those skilled in the art will recognize that DigitalMedia cable is a multi-generational family of interface cables particularly designed for media transmission for extended lengths.

Within a single plenum-rated jacket, original DigitalMedia cable contains one high-bandwidth/low-crosstalk shielded 4-twisted pair (STP) cable, one CAT5e unshielded 4-twisted pair (UTP) cable, and one DMNet cable. The STP "Audiovisual data" cable is of a specialized construction designed to allow the longest possible cable lengths for transporting high-definition digital video and audio. The Cat5e "Data Management" cable carries high-speed Ethernet and other data, plus 5V direct current (DC) power. Finally, the DMNet cable carries additional proprietary control signals and 24V DC power. Original DigitalMedia cable is rated for up to 220 ft of audiovisual transmission.

FIG. 6 is a block diagram of the extended transmission board and the output board shown in FIG. 5, according to an embodiment of the invention. The block diagram of the output board 310 is similar to the block diagram of the output board 310 in FIG. 4, with the exception being that in FIG. 5, the receiver 401 is an HDCP receiver configured for receiving HDCP content over an HDCP interface 502. The extended transmission board 510 comprises a receiver 601 and an HDCP transmitter 615.

FIG. 7 is a flowchart showing illustrative steps to perform a method for reducing the switching time in a video distribution network 300, according to an embodiment of the invention.

In step 701, a switcher device 302 receives audiovisual data at a first input board 308a via an HDCP link between a first video sink 106a and the first input board 308a.

In step 702, the switcher device 302 routes audiovisual data from the first input board 308a to an output board 310a.

In step 704, the output board 310 transmits audiovisual data to a video sink 106 over a security protocol link. In an embodiment of the invention, the output board 310 scales the audiovisual data received from the first input board 308a to the native resolution of the video sink 106 (step 703) prior to transmitting to the video sink 106.

In step 705, the processing unit 318 of the switcher device 302 receives a control signal to switch from routing audiovisual data from the first input board 308a to routing audiovisual data from the second input board 308b.

In an embodiment of the invention, the switching device processing unit 318 transmits a prepare signal to the output board 310a, indicating that there will be a switching discontinuity (step 706).

In an embodiment of the invention, the output board 310a generates image content data, such as black frames of video, in response to receiving the prepare signal from the switching device processing unit 318 (step 707). The scaler 402 outputs the generated image content data rather than the live image content data being routed to the output board 310a from the multiplexer 306.

In step 708, the multiplexer 306 ceases routing audiovisual data from the first input board 308a.

In step 709, the output board 310 continues generating video timing data at a native resolution during the delay between receiving audiovisual data from the first input board 308a and receiving audiovisual data from the second input board 308b. By outputting a continuous stream of video timing data, the output board 310a maintains the authenticity of the security link between the output board 310a and the video sink 106.

In step 710, the switcher device 302 receives audiovisual data at a second input board 308b via an HDCP link between a second video sink 106b and the second input board 308b.

In step 711, the switcher device 302 routes audiovisual data from the second input board 308b to the output board 310a.

In step 712, the output board continues generating and outputting image content data (i.e. black frames of video) until video lock is achieved.

In step 714, the output board 310a transmits live image content data routed from the second input board 308a to the video sink 106 over an HDCP link. In an embodiment of the invention, the output board 310a scales the audiovisual data received from the first input board 308a to the native resolution of the video sink 106 (step 713) prior to transmitting to the video sink 106.

The following is a pseudo-code representation of the operation in accordance with an illustrative embodiment of the present invention.

Detect a user control signal to switch from a first video source to a second video source
Transmit a prepare signal to a processing unit of an output board in response to the detection of the user control signal
Detect the prepare signal at the output board
Instruct scaler to generate image content data
Cease routing audiovisual data from a first video source to the output board
Continue generating video timing data at the scaler of the output board
Begin routing audiovisual data from a second video source to the input board
Cease generating image content data upon achieving video lock Any process descriptions or blocks in flow charts should be understood as representing modules, segments or portions of code that include one or more executable instructions for implementing specific logic functions or steps in the process. Alternate implementations are included within the scope of the preferred embodiment of the present invention in which functions may be executed out of order from that shown or discussed, including substantial concurrence or reverse order, depending on the functionality involved, as would be understood by those reasonably skilled in the art of the present invention. Also, steps disclosed as separate may be performed concurrently or combined, and a step shown as discrete may be performed as two or more steps. Furthermore, numerical values and disclosures of specific hardware are illustrative rather than limiting. Moreover, while the preferred embodiment has been disclosed in the context of HDMI, the invention can be implemented for use with another suitable interface that uses HDCP, such as DVI or any substantially HDMI-like interface. Therefore, the present invention should be construed as limited by only the appended claims.

In this description, various functions and operations may be described as being performed by or caused by software code to simplify description. However, those skilled in the art will recognize what is meant by such expressions is that the functions result from execution of the code by a processor or processing unit, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine of computer-readable media used to actually effect the distribution.

At least some aspects disclosed can be embodied, at least in part, in software. That is, the techniques may be carried out in a computer system or other data processing system in response to its processor/processing unit, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs". Invocation interfaces to these routines can be exposed to a software development community as an API (Application Programming Interface). The computer programs typically comprise one or more instructions set at various times in various memory and storage devices in a computer, and that, when read and executed by one or more processors/processing units in a computer, cause the computer to perform operations necessary to execute elements involving the various aspects.

A machine readable medium can be used to store software and data which when executed by a data processing system causes the system to perform various methods. The executable software and data may be stored in various places, including for example ROM, volatile RAM, non-volatile memory and/or cache. Portions of this software and/or data may be stored in any of these storage devices. Further, the data and instructions can be obtained from centralized servers or peer to peer networks. Different portions of the data and instructions can be obtained from different centralized servers and/or peer-to-peer networks. Different portions of the data and instructions can be obtained from different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media, such as volatile and non-volatile memory devices, read-only memory (ROM), random access memory (RAM), flash memory devices, floppy and other removable disks, magnetic disk storage media, optical storage media (e.g. Compact Disc Read-Only Memory (CD ROM), Digital Versatile Discs (DVDs), etc.) among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e. stores and/or transmits) information in a form accessible by a machine (e.g. a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination or hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

INDUSTRIAL APPLICABILITY

To solve the aforementioned problems, the present invention is a unique device in which an output board 310 with a scaler 402 minimizes switching delay in a video distribution network 300 by outputting a continuous stream of audiovisual data during switching events.

LIST OF ACRONYMS USED IN THE DETAILED DESCRIPTION OF THE INVENTION

The following is a list of the acronyms used in the specification in alphabetical order.
AV audiovisual
CAT5e category 5 enhanced
DC direct current
DCP Digital Content Protection, LLC
DDC Display Data Channel
DM DigitalMedia
DRM digital rights management
DVD digital video disc
DVR digital video recorder
EDID extended display data channel
HDCP high-definition
HDMI high definition multimedia interface
PCB printed circuit board
STP shielded twisted pair
TMDS transition minimized differential signaling
UTP unshielded twisted pair Alternate Embodiments Alternate embodiments may be devised without departing from the spirit or the scope of the invention. For example, during switching events, the output scaler 402 may generate video information such that a switching graphic will be displayed on the screen or a color other than black.

What is claimed is:

1. A switcher device comprising:
  (a) at least two input boards, each of the at least two input boards configured for receiving audiovisual data from a video source over a security protocol link; and
  (b) a multiplexer communicatively coupled between the at least two input boards and an output board and configured for dynamically routing audiovisual data from the at least two input boards to the output board, and wherein
  the output board is configured for
    (i) transmitting audiovisual data to a downstream video sink over a security protocol link, and
    (ii) maintaining the security protocol link in an authenticated interface with the downstream video sink during a switching event between the at least two input boards by outputting a continuous stream of uninterrupted video timing data during the switching event and wherein
  the output board further comprises a scaler configured for generating the continuous stream of video timing data during the switching event,
  the continuous stream of video timing data being generated in the absence of video timing data received from the at least two input boards.

2. The switcher device of claim 1 wherein the switching event is a switch from receiving video from a first source to receiving video from a second source.

3. The switcher device of claim 1 wherein the switching event is a switch from receiving video at a first resolution to receiving video at a second resolution.

4. The switcher device of claim 1 wherein the switching event is a switch from receiving video at a first refresh rate to receiving video at a second refresh rate.

5. The switcher device of claim 1 wherein the scaler is further configured for generating black frames of image content data during the switching event.

6. The switcher device of claim 5 wherein the scaler is configured for continuing to generate black frames of image content data until receiving a sufficient amount of image content data for generating a stable output of converted image content data.

7. The switcher device of claim 1 wherein the scaler generates continuous video timing data at a native resolution of the sink.

8. The switcher device of claim 7 wherein the scaler determines the native resolution of the video sink from Extended Display Identification Data (EDID) information of the video sink.

9. The switcher device of claim 1 wherein the security protocol comprises High-Bandwidth Digital Content Protection (HDCP).

10. The switcher device of claim 9 wherein the continuous stream of video timing data satisfies step three of the HDCP authentication protocol.

11. The switcher device of claim 1 wherein the switcher device comprises a chassis and wherein the output board is disposed on a modular output board configured for being removably inserted into a slot in the housing.

12. The switcher device of claim 1 wherein the output board is external to a housing of the switcher device.

13. The switcher device of claim 12 further comprising an extended transmission board and wherein
 (a) the multiplexer routes audiovisual data from the at least two input boards to the output board via the extended transmission board,
 (b) the extended transmission board is configured for transmitting audiovisual data to the output board over a security protocol link, and
 (c) the output board is further configured for receiving audiovisual data over a security protocol link.

14. The switcher device of claim 1 wherein the output board further comprises an HDMI transmitter.

15. The switcher device of claim 5 wherein the switcher device comprises a processing unit in communication with the multiplexer and the output controller and wherein the processing unit transmits a prepare signal to the output board a predetermined amount of time before transmitting a switch signal to the multiplexer.

16. A switcher device comprising:
 (a) at least two input boards, each of the at least two input boards configured for receiving audiovisual data from a video source over an HDCP link;
 (b) a multiplexer board comprising:
  (i) a multiplexer communicatively coupled between the at least two input boards and an output board and configured for dynamically routing audiovisual data from the at least two input boards to the output board, and
  (ii) a processing unit in communication with the multiplexer and the output board and configured for transmitting a switch signal to the multiplexer and a prepare signal to the output board prior to a switching event between the at least two input boards; and
 (c) the output board configured for transmitting audiovisual data to a video sink over an HDCP link and comprising
  (i) a receiver configured for receiving audiovisual data routed from the multiplexer,
  (ii) a scaler configured for converting audiovisual data received via the multiplexer to a native resolution of the video sink, generating a continuous stream of uninterrupted video timing data during the switching event at the native resolution of the video sink during the switching event wherein the continuous stream of uninterrupted video timing data is generated in the absence of video timing data received from the at least two input boards, and generating image content data for a period of time until achieving video lock in response to receiving the prepare signal, and
  (iii) a transmitter configured for encrypting and transmitting generated audiovisual data to the video sink over an HDCP interface and maintaining the security protocol link in an authenticated interface with the video sink by outputting the continuous stream of uninterrupted video timing data during the switching event.

17. An output board for a switcher device configured for transmitting audiovisual data to a video sink over a security protocol link, the output board comprising:
 (a) a receiver configured for receiving audiovisual data from at least two input boards;
 (b) a scaler configured for converting the audiovisual data to a native resolution of the video sink and generating audiovisual data during a switching event between the at least two input boards comprising a continuous stream of uninterrupted video timing data, wherein the continuous stream of uninterrupted video timing data is generated in the absence of video timing data received from the at least two input boards;
 (c) a transmitter configured for encrypting and transmitting the output of the scaler and further configured for maintaining the security protocol link in an authenticated interface with the video sink.

18. The output board of claim 17 wherein the switching event is a switch from receiving audiovisual data from a first source to receiving audiovisual data from a second source.

19. The output board of claim 17 wherein the switching event is a switch from receiving audiovisual data at a first resolution to receiving audiovisual data at a second resolution.

20. The output board of claim 17 wherein the switching event is a switch from receiving audiovisual data at a first refresh rate to receiving audiovisual data at a second refresh rate.

21. The output board of claim 17 wherein the scaler is configured for generating image content data during the switching event.

22. The output board of claim 21 wherein the scaler is configured for generating image content data after a switching event until receiving a sufficient amount of audiovisual data to generate a stable output of converted audiovisual data.

23. The output board of claim 22 wherein the scaler determines the native resolution of the video sink from Extended Display Identification Data (EDID) information of the video sink.

24. The output board of claim 17 wherein the security protocol comprises High-Bandwidth Digital Content Protection (HDCP).

25. A method for reducing switching delay when switching sources in a video distribution network, the method comprising the steps of:

(a) receiving audiovisual data at a first input board from a first video sink over a security protocol link;
(b) routing audiovisual data from the first input board to an output board;
(c) transmitting audiovisual data from the output board to a video sink over a security protocol link;
(d) receiving a user control signal to switch to a second video source;
(e) generating a continuous stream of uninterrupted video timing data at the output board during a delay between receiving audiovisual data from the first input board and receiving audiovisual data from the second input board, wherein said receiving of audiovisual data between the first input board and the second input board constitutes a switching event, to maintain authenticity of security protocol link between the output board and the video sink, wherein the continuous stream of uninterrupted video timing data is generated in the absence of video timing data received from the first input board or the second input board during the switching event between the first input board and the second input board;
(f) receiving audiovisual data at a second input board from a second video sink over a security protocol link;
(g) routing audiovisual data from the second input board to the output board; and
(h) transmitting audiovisual data from the output board to the video sink over a security protocol link.

26. The method of claim 25 further comprising the steps of:
(a) scaling audiovisual data received from the first input board to a native resolution of the display; and
(b) scaling audiovisual data received from the second input board to the native resolution of the display.

27. The method of claim 25 further comprising the step of generating image content data during the delay between receiving audiovisual data from the first input board and receiving audiovisual data from the second input board.

28. The method of claim 27 further comprising the step of:
(a) continuing to generate audiovisual data at the output board until an amount of audiovisual data sufficient to produce stable scaled audiovisual data is received from the second input board.

29. The method of claim 25 further comprising the step of:
(a) transmitting a prepare signal to the output board.

30. A non-transitory computer readable medium program product for reducing switching time in a video distribution network, the computer program product comprising:
a non-transitory computer readable medium readable storage medium having computer readable code embodied therewith, the computer readable program code comprising:
computer readable program code configured to:
(a) detect a user control signal to switch from a first video source to a second video source, wherein said switch from the first video source to the second video source constitutes a switching event;
(b) transmit a prepare signal to a processing unit of an output board in response to the detection of the user control signal;
(c) detect the prepare signal;
(d) instruct a scaler to generate audiovisual data comprising a continuous stream of uninterrupted video timing data in response to the detection of the prepare signal, wherein the scaler is configured for generating the continuous stream of video timing data in the absence of video timing data received from the first video source and the second video source during the switching event, and maintaining a security protocol link in an authenticated interface with a downstream video sink during the switching event;
(e) cease routing audiovisual data from a first video source to the output board;
(f) continue generating video timing data at the scaler of the output board;
(g) begin routing audiovisual data from a second video source to the input board; and
(h) cease generating image content data upon achieving video lock.

31. The switching device of claim 1, wherein the scaler is further configured to operate in a free running mode by automatically generating video timing data during the switching event.

32. The switching device of claim 16, wherein the scaler is further configured to operate in a free running mode by automatically generating video timing data during the switching event.

33. The output board of claim 17, wherein the scaler is further configured to operate in a free running mode by automatically generating video timing data during the switching event.

34. The method of claim 25, wherein the step of generating a continuous stream of uninterrupted video timing data comprises:
automatically generating video timing data in a free funning mode at the output board.

35. The non-transitory computer readable medium program product of claim 30, wherein the non-transitory computer readable medium program code is further configured to
(i) automatically generate video timing data in a free funning mode at the scaler.

* * * * *